United States Patent [19]
Marshall

[11] 4,377,934
[45] Mar. 29, 1983

[54] COMBUSTION ENGINE WITH STEAM POWERED PISTON ASSIST

[76] Inventor: John W. Marshall, Rte. 2, Box 523, Knightdale, N.C. 27545

[21] Appl. No.: 167,374

[22] Filed: Jul. 9, 1980

[51] Int. Cl.³ ............................................. F01K 23/06
[52] U.S. Cl. ..................................... 60/712; 60/618
[58] Field of Search ................. 60/618, 620, 621, 712

[56] References Cited
U.S. PATENT DOCUMENTS
3,921,404 11/1975 Mason .................................. 60/618

*Primary Examiner*—Allen M. Ostrager
*Attorney, Agent, or Firm*—Mills and Coats

[57] ABSTRACT

The present invention entails a combustion type engine of the internal reciprocally mounted piston type. Formed adjacent the conventional combustion pistons and communicatively open thereto are a series of steam pistons reciprocally mounted in alignment in face-to-face relationship with said combustion pistons. A steam generator is provided and utilizes engine exhaust heat to produce steam that is directed to the cylinders having said steam pistons reciprocally mounted for driving the same in time relationship to the reciprocal movement of said combustion pistons. Essentially the steam pistons are driven such that they assist in driving the combustion pistons by exerting a force against the combustion pistons during the ignition or combustion stroke of the combustion pistons.

10 Claims, 13 Drawing Figures

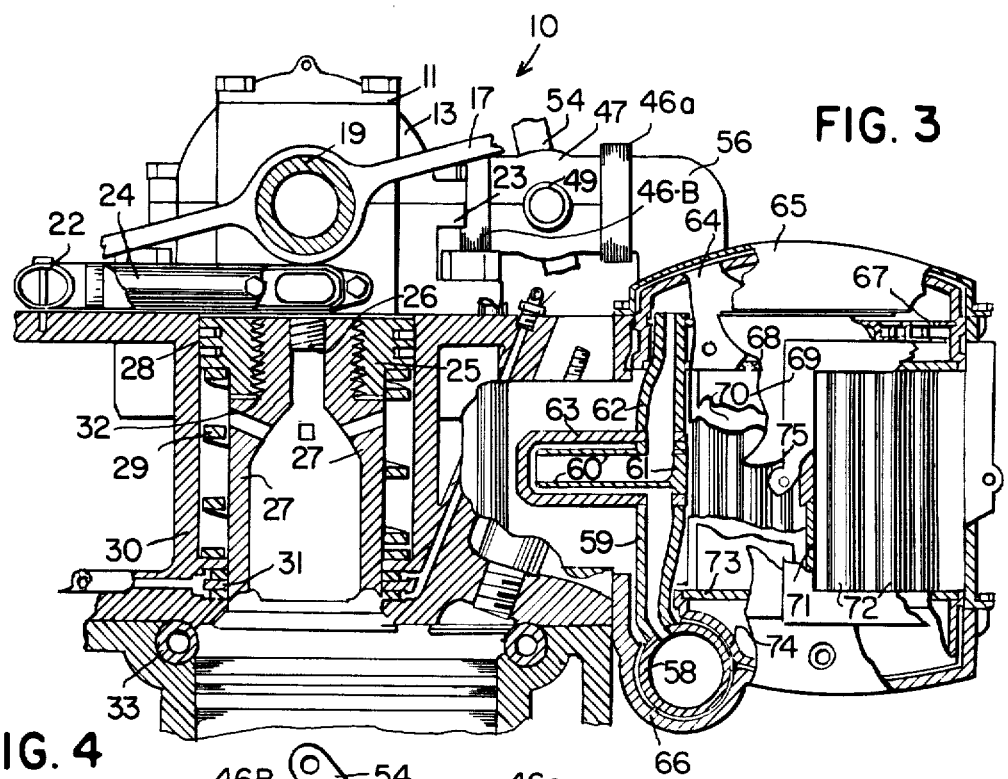

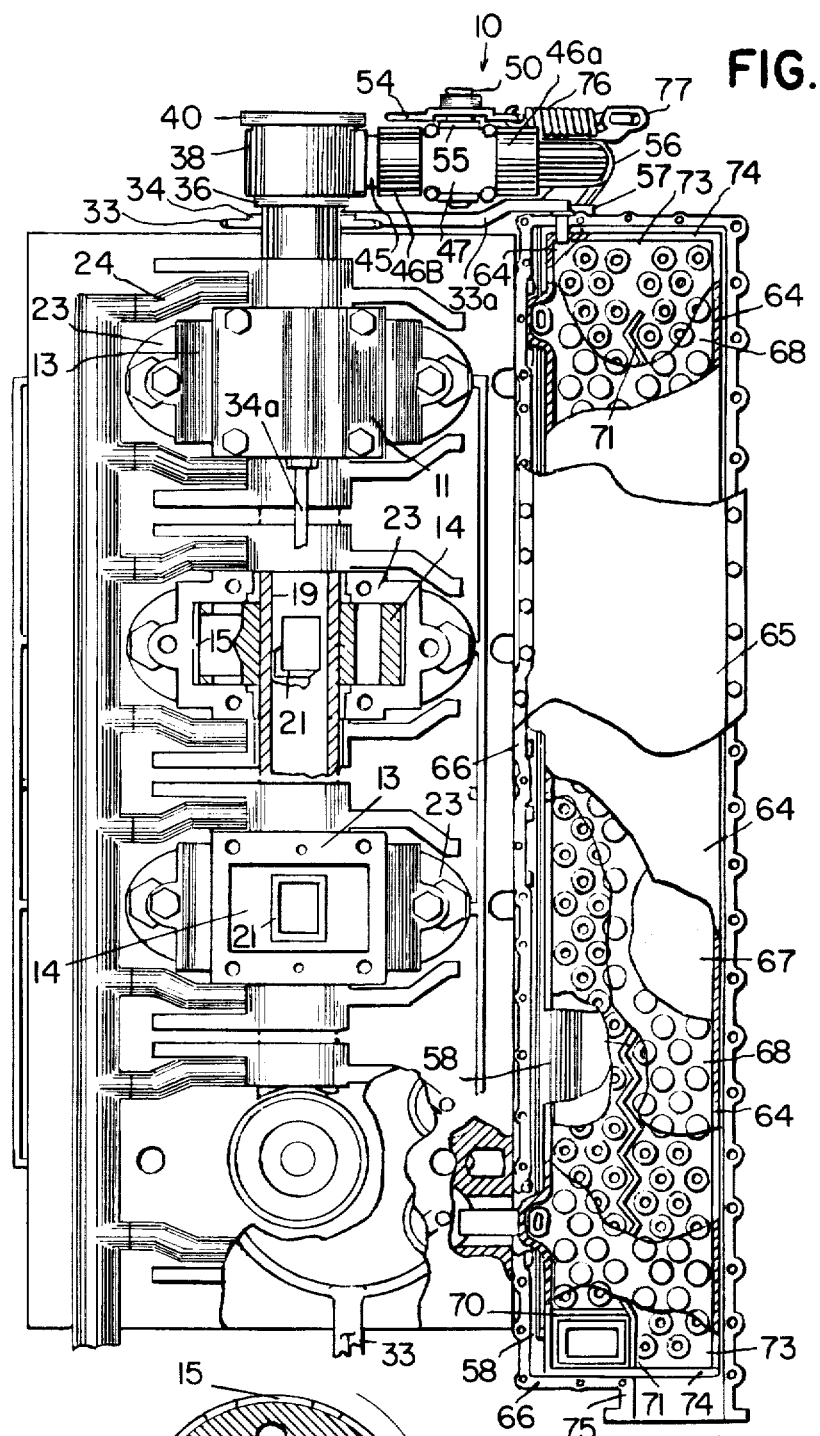
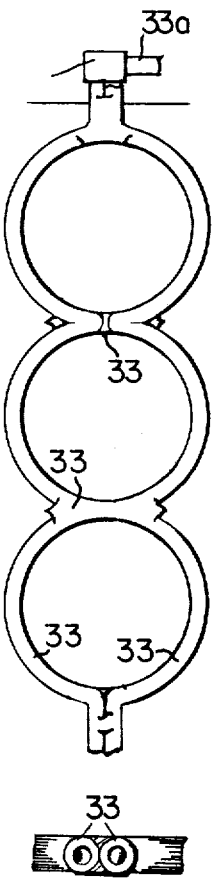
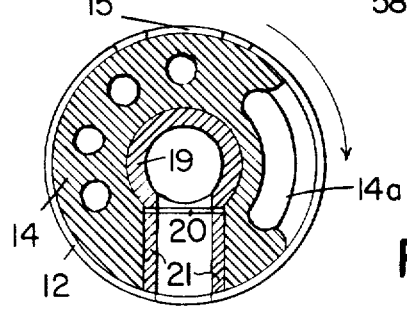
FIG. 8
FIG. 10
FIG. 9

COMBUSTION ENGINE WITH STEAM POWERED PISTON ASSIST

FIELD OF INVENTION

The present invention relates to engines and more particularly to internal combustion engines having a steam powered piston assist assembly for assisting in the driving of the combustion pistons.

BACKGROUND OF INVENTION

In recent years people of our nation and the world have come to realize and appreciate the realities of our energy resources. People are continually reminded of the shortages of energy by continuing to pay greater prices for energy, and in some cases even being unable to purchase gasoline and oil at any price for example.

Our situations in the field of energy has encouraged the implementation of programs designed to conserve energy and has in general spurred a renewed interest in designing and developing more efficient machines. In this latter regard, over the past seven years or so, there has been substantial research and development in attempting to design and make the internal combustion engine more efficient. The work that has been done in this area has covered a wide range. For example, there has been much work in reducing the size of internal combustion engines for automobiles. In addition, there has likewise been a great deal of work in attempting to make the engine itself more efficient. In this regard, for example, there has been a vast amount of development in the area of heating or vaporizing fuel prior to combustion to make the same more volatile and to generally increase the amount of useable energy extracted from a specified volume of fuel.

Certainly there has been progress in designing a more fuel efficient engine. But yet the progress has not been as great or as substantial as needed in terms of the scope of our energy problems. This is particularly significant since the internal combustion engines itself gives off substantial energy in the form of heat to which a large degree is not utilized by the vehicle engine. Therefore, it would seem appropriate and desirable to attempt to harness this energy given off and expelled by the internal combustion engine and attempt in some way to redirect it back into the engine for useful work.

SUMMARY OF INVENTION

The present invention entails an internal combustion engine that is provided with a steam powered piston assembly that is designed to cooperate with the conventional combustion pistons to assist the same in delivering output power. In particular, tne engine is provided with a series of power assist or steam cylinders disposed directly over the conventional combustion cylinders of the engine, with the steam cylinders being open or communicatively connected with the combustion cylinders. In each steam cylinder, there is reciprocally mounted a power assist or steam piston that is movable between a retracted position and an extended position. For driving the steam piston, the engine is provided with a steam generator that utilizes the exhaust heat from the engine to produce steam that is in turn selectively directed against the steam piston for driving the same from the retracted to the extended position. The reciprocal movement of the steam piston is controlled in accordance with the reciprocal movement of the combustion pistons. In particularly, by the provision of control valve means, steam is directed against the steam piston such that it is extended downwardly into the combustion cylinder as the combustion piston moves downwardly on the ignition or power stroke cycle. Consequently, it is appreciated that this action of the steam piston applies a force against the face of the combustion piston and consequently assists in driving the same and reducing the fuel required by the engine for a given amount of work.

It is, therefore, an object of the present invention to provide a very efficient combustion engine that effectively reduces the fuel required to do a given amount of work compared to conventional combustion engines.

Another object of the present invention is to provide a steam assist combustion engine that produces steam with exhaust heat from the engine and directs the resulting steam to a series of pistons where the steam acts to drive the pistons in a cooperative fashion with the combustion pistons so as to generally reduce the fuel required to do a given amount of work.

A further object of the present invention resides in the provision of an internal combustion engine with conventional reciprocally mounted combustion pistons wherein there is provided opposite the combustion pistons a series of steam powered pistons that cooperate with the combustion pistons to help drive the same and to generally reduce the fuel requirements for a given amount of work.

Still a further object of the present invention resides in the provision of a steam generator for a steam assist internal combustion engine of the character referred to above wherein the steam generator is of a very efficient design and makes optimum use of the energy found in the exhaust gases being expelled by the engine.

Still a further object of the present invention resides in the provision of a steam generator for an internal combustion engine of the character referred to above which is also provided with a super heater assembly for transferring heat to the steam or water vapor prior to its use by the engine to drive said steam pistons.

It is also an object of the present invention to provide an internal combustion engine with a steam actuated power assist system that is relatively simple, durable, reliable, and easy to operate and maintain.

Still a further object of the present invention resides in the provision of an internal combustion engine with said steam actuated power assist system that is provided with control means for controlling the flow of steam from said steam generator to the cylinders housing said steam pistons.

Other objects and advantages of the present invention will become apparent from a study of the following description and the accompanying drawings which are merely illustrative of the present invention.

BRIEF DESCRIPTION OF DRAWINGS

FIG. 3 is an end sectional view of the steam actuated power assist system for the internal combustion engine of the present invention.

FIG. 4 is a side sectional view illustrating a steam flow regulating valve for controlling the flow of steam from the steam generator to the engine.

FIG. 5 illustrates pressure seals and an associated spring utilized by the rotary valve assembly that controls the flow of steam into the engine.

FIG. 6 is an enlarged illustration of structure enclosing a portion of a steam channeling pipe that directs steam from the steam generator to the engine.

FIG. 7 is an end sectional view of the steam generator of the present invention and its associated super heater.

FIG. 8 is a top plan view of the engine of the present invention with said steam actuated power assist system incorporated therein with portions broken away to better illustrate the structure thereof.

FIG. 9 is an end sectional view of the rotary valve assembly of the present invention.

FIG. 10 is a top plan view illustrating an auxiliary heating element assembly associated with the present invention.

COMBUSTION ENGINE WITH STEAM DRIVEN POWER ASSIST SYSTEM

With further reference to the drawings, the engine of the present invention with the steam actuated power assist system is shown therein and indicated generally by the numeral 10. Engine 10 includes a conventional block assembly having a plurality of combustion cylinders 10a formed therein with each combustion cylinder 10a including a reciprocally mounted combustion piston 10b. Details of this portion of the invention are not dealt with herein because the basic design and function are essentially the same as is found in conventional combustion engines.

Figure 1:
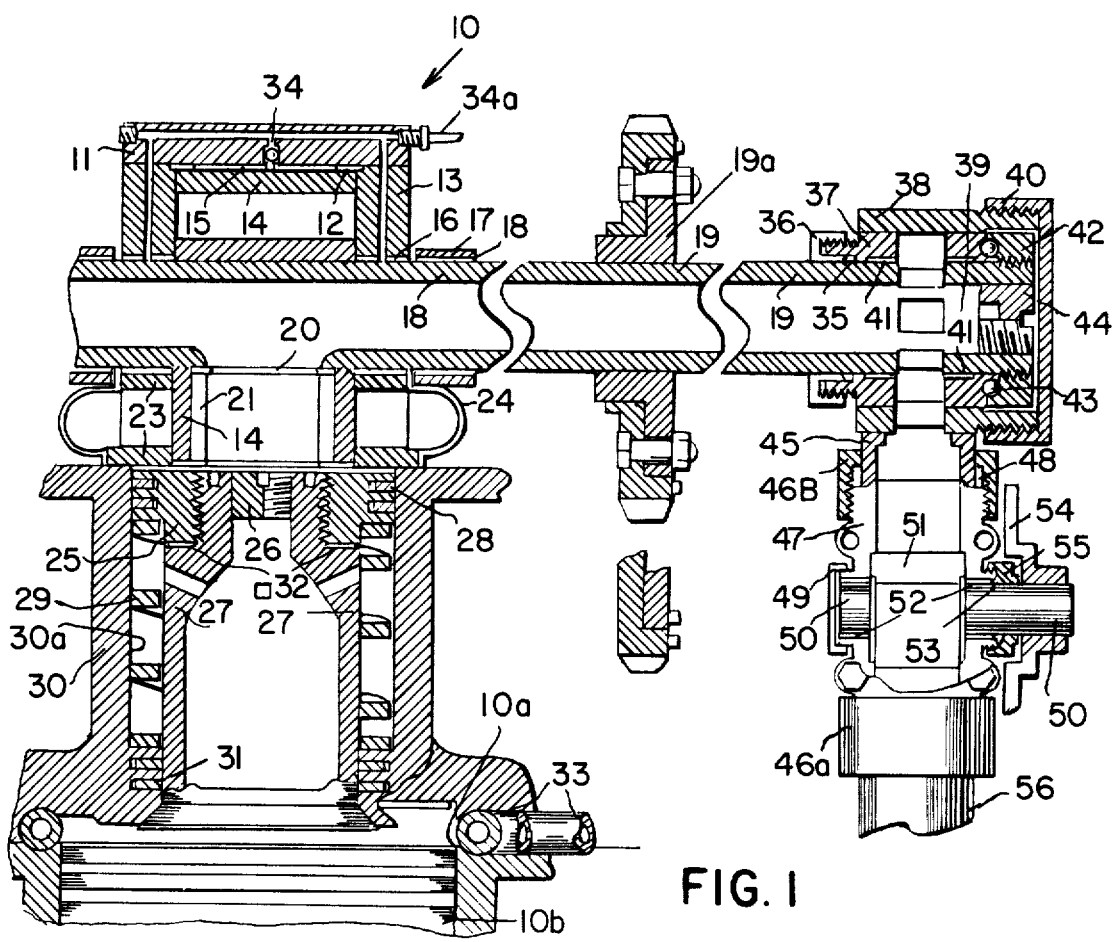
FIG. 1 is a side sectional view of the steam actuated power assist system of the present invention.
Figure 2:
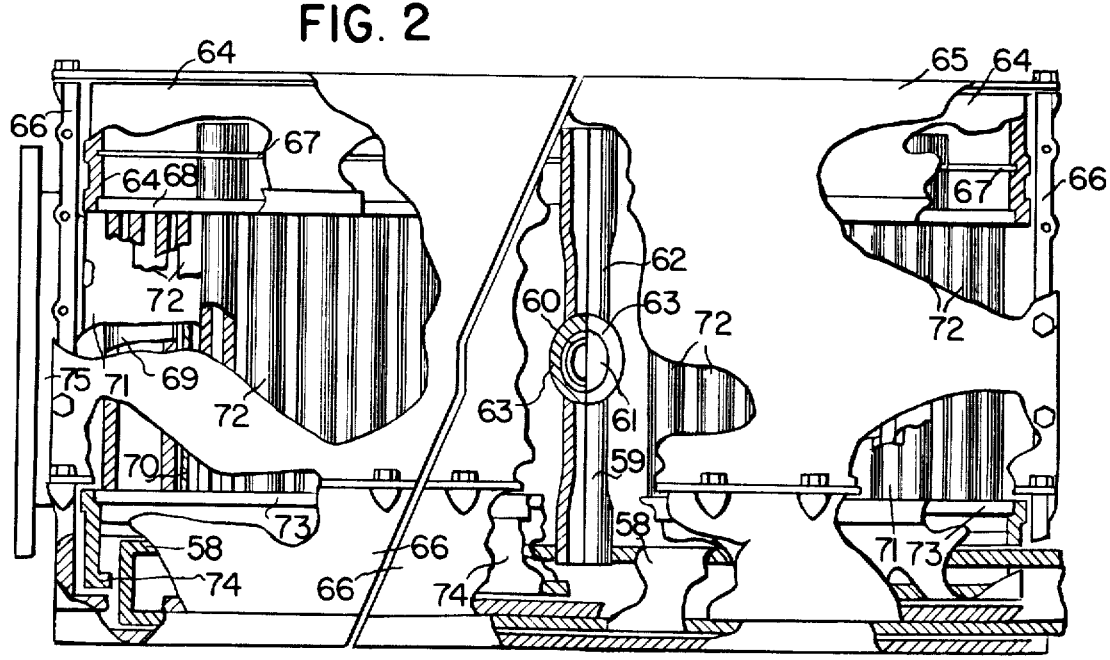
FIG. 2 is a side elevational view of the steam generator of the present invention with portions broken away to better illustrate the internal structure thereof.

The engine block assembly extends upwardly over the combustion cylinders 10a and defines directly above each combustion cylinder 10a a block wall structure 30 that forms a second set of piston or steam cylinders 30a. Reciprocally mounted in each of these cylinders is a steam piston having a main body portion 27, a removable upper part 25 and a center plug 26. Interposed between the cylinders 30a and piston 27 are compression rings 28 disposed about the top and a second set of compression rings 31 formed about the bottom. Coiled around piston 27 between the rings 28 and 31 is a spring assembly 29 that biases piston 27 to a retracted position, as shown in FIG. 1. It is to be appreciated, however, as will be understood from subsequent portions of this disclosure, that steam piston 27 may be moved downwardly to an extended position where the same would actually project downwardly into the underlying combustion cylinder 10a. The presence of spring assembly 29 would return piston 27 to the retracted position once the active force pushing the same downwardly is overcome by the spring assembly.

As viewed in FIGS. 1 and 10, there is shown an auxiliary steam producing assembly 33 that generally extends around the interface area between the steam pistons 27 and the conventional combustion pistons 10b. Water can be circulated through this steam producing assembly 33 and the heat from the combustion process will be sufficient to heat the water which in turn may vaporize the same and produce steam. The produced steam can be directed to where the same joins steam produced by the steam generator. As shown in FIG. 8, a connecting line 33a extends from assembly 33 and is operative to dump steam into the top of the steam generator.

To supply steam to the steam cylinders 30a, there is provided an elongated steam pipe 19 that is rotatively journaled above the respective steam cylinders 30a and disposed in alignment thereover. Steam pipe 19 includes a plurality of rotary valves secured thereto and rotatable therewith, with one rotary valve being provided for each steam cylinder 30a and associated piston 27.

More particularly, each rotary valve is housed within a housing structure that includes an upper one-half housing 13 and a lower one-half housing 23. Each valve is provided with a removable surface cover 11 and thereunder is provided an insert or liner 12. There is also provided a service opening 15. The main body of the rotary valve is referred to by numeral 14 and is in fact secured to steam pipe 19 for rotation therewith. Valve body 14 includes an outlet steam opening defined therein and communicatively connected or open to steam pipe 19. This outlet steam opening is defined by pressure seals 21 and a spring clip 20 that exerts a continuing pressure thereon to close the interface between steam cylinders 30a and the rotary valve itself.

As seen in FIG. 9, the rotary valve also includes an exhaust portion indicated generally by the numeral 14a. When the exhaust portion 14a overlies the steam piston 27, it is appreciated that the opening formed in the lower housing 23 would allow exhaust gases to be exhausted therethrough into a surrounding exhaust conduit 24 that surrounds the lower housing 23. From the exhaust conduit 24, the exhaust gases or material is directed to an exhaust line 22 that connects to the steam cylinders 30a. Consequently, it is appreciated that for each rotation of the steam pipe 19, that both the steam outlet opening defined by pressure seals 21 and the exhaust opening 14a will appropriately align over the steam cylinders 30a to permit steam to be directed into and out of the respective steam cylinders.

To lubricate the rotary valve assembly just discussed, there is provided a pressure responsive lubrication ball 34 and a lubrication line 34a (as seen in FIG. 1). This enables the rotary valve to be lubricated only when there is not substantial pressure build up acting on the lubrication ball 34. Consequently, when there is internal pressure within rotary valve, it follows that the lubrication ball will assume a position that will block the flow of oil downwardly therepass into the rotary valve.

As pointed out above, steam pipe 19 is rotatively journaled and supported above the respective steam cylinders 30a. In addition, it is seen that the engine is provided with a plurality of rocker arms 17 with the respective rocker arms being supported about steam pipe 19 by bushings 18. In addition, there is provided an adjustable gear assembly 19a that is secured to steam pipe 19 for rotatively driving the same. It is appreciated that steam pipe 19 would be appropriately driven in timed relationship to the reciprocal movement of the respective combustion pistons 10b. The significance of this will be understood more fully from subsequent portions of this disclosure.

The present invention is designed to produce steam by utilizing the exhaust heat of the engine and this produced steam is directed to the respective steam cylinders 30a where the steam in a control fashion is directed against the respective steam pistons 27. In order to generate this steam, the present invention provides a steam generator that is shown in FIGS. 1, 2, 3, 7 and 8.

Viewing this structure in detail, it is seen that the same includes a lower reservoir section comprised of a bottom 74 and a top plate 73. Steam generator further includes an upper section that is formed by plate 68 and a top wall structure 64. Provided within this upper section is a water deflector panel assembly 67.

Disposed intermediately between the upper and lower sections of the steam generator is a series of vertical pipes that are referred to as steam generating elements 72. Each of these pipes are communicatively open to both the upper and lower sections. There is provided a separating panel 71 that extends longitudinally between respective pipes 72 and which generally acts to channel the flow of heat through one half section of the pipe 72 and then through the final half section before exhaust. In addition, there is provided a water return conduit 69 that extends from the upper section to the lower section and this conduit is protected by heat shield 70. There is also provided a neck structure 75 as seen in FIG. 8 which helps to support the exhaust manifold pipe.

For enclosing the steam generator, the same is further provided with a cover 65 and an exterior housing 66.

Extending outwardly from the heat generator adjacent the engine is a super heater assembly that as illustrated in FIGS. 3 and 7 comprise a series of wall structure made up of walls 61, 62, 63 and 59. As seen, wall structure 63 protrudes inwardly and is adapted to fit around the exhaust area where exhaust gases are exhausted from the engine through the steam generator. Within this protrusion there is provided a pipe like structure having side walls 60 which channel the steam or water vapor therethrough and into the area inwardly of structure 63 and 59. A steam supply line 58 is communicatively open to this super heater assembly and the final steam is directed into line 58 where the steam is directed therefrom to a flow regulating valve assembly 47 as shown in FIG. 4.

From steam supply line 58, steam is directed into a supply line 56 that is first coupled to a regulating valve housing 47 by a first coupler 46a. Valve 47 includes a shaft 50 with valve portions 51 extending therefrom as best illustrated in FIG. 4. As seen in FIG. 1, bushings 52 support shaft 50 and there is provided pressure seal 53 about shaft 50 which is pressed to proper adjustment by a threaded cap nut 55. In addition, about the opposite portion of shaft 50 there is provided another cap nut 49. Extending from shaft 50 is a control lever 54 that is adapted to be operatively connected to the throttle of the engine for adjusting the steam that may pass therethrough. It is seen in FIG. 4 that the lever 54 is spring biased to a closed position by spring 76. As still seen in FIG. 4, it is seen that valve housing 47 is coupled to a connecting coupler 45 by an exterior coupler 46b, while coupler 45 is designed to merge and connect with cap housing 38 which surrounds the inlet portion of steam line 19.

Viewing the structure utilized between the regulating valve 47 with the inlet end of steam pipe 19, it is seen that there is a packing seal 35 provided that is pressed on and retained by caps 36 and 37, which are held in place by outer coupling assembly 38. There is also provided an end assembly 39 with bushings 41 that is retained by an end cap 40. A retainer nut 42 is screwed on the end of supply line 19 and fits to bearings 43. Finally there is provided an end plug 44 for sealing the end of steam supply pipe 19.

In operation steam is produced by the steam generator and directed to the flow regulating valve 47 that is adapted to be operated in accordance with the actuation and operation of the engine throttle. By opening regulating valve 47, steam is allowed to pass therethrough into steam supply line 19 which is rotatively driven by gear 19a in time relationship to the operation of the engine and particularly the reciprocal movement of the combustion pistons 10b. This rotation results in the respective rotary valves being open and closed and open for exhaust. Once the rotary valve is open, steam is allowed to be directed from the steam supply line 19 through the outlet passage defined by seals 21 to where the steam pressure acts against the respective steam piston 27. This steam pressure drives the piston 27 downwardly against the force of the springs 29. The actuation of the rotary valve is designed and timed such that steam piston 27 is only actuated during the ignition or firing stroke of the combustion piston 10b. As a result, the steam piston 27 tends to apply a force against the downwardly moving combustion piston 10b effectively assisting and driving the same. The rotary valve then closes and this is followed by the alignment of the exhaust portion 14a with the steam cylinder 30a. This allows the water or water vapor or steam to be exhausted into lower housing 23 and on into the surrounding exhaust conduit 24. As this exhaust takes place, the spring 29 then acts to push the steam piston back to its retracted position prior to the return of the combustion piston 10b to its upper position as shown in FIG. 1. It is also appreciated that the vacuum created within the steam valve will assist in holding the steam piston 27 in its retracted position. It is further appreciated that the exhaust steam could be directed to a condenser where the same could be condensed and directed back to the steam generator for further use.

Therefore, it is appreciated that the continuous operation of the present invention will result in the steam actuated pistons 27 assisting in driving the engine inasmuch as they are designed to exert force against the combustion pistons on their ignition or firing stroke by compressing air and/or gases against the combustion pistons.

From the foregoing specification, it is appreciated that the engine of the present invention is designed to efficiently utilize the energy being expended by the engine inasmuch as heat being exhausted by the engine is utilized to generate steam which in turn is directed back into the engine where the energy thereof is efficiently used.

The terms "upper", "lower", "forward", "rearward", etc., have been used herein merely for the convenience of the foregoing specification and in the appended claims to describe the steam assisted combustion engine and its parts as oriented in the drawings. It is to be understood, however, that these terms are in no way limiting to the invention since the steam assisted systemtion engine may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A combustion type engine with a steam powered piston assist system comprising: a combustion type engine assembly having an engine block with combustion cylinder means formed therein for receiving reciprocally mounted combustion piston means; steam cylinder means formed adjacent said cylinder means of said combustion type engine; steam piston means reciprocally mounted within said steam cylinder means and adapted to cooperate with said combustion piston means for assisting in driving the same during the combustion process; steam generator means associated with said engine for generating steam; means operatively connected between said steam generator means and said steam cylinder means for directing steam from said steam generating means to said steam cylinder means; control means operatively associated with said engine for selectively directing steam to said steam cylinder means in time relationship to the reciprocal movement of said combustion piston means for driving said steam piston means in time relationship with the reciprocal movement of said combustion piston means; and wherein said steam cylinder means and the combustion cylinder means having said combustion piston means reciprocally mounted are communicatively connected to each other such that said steam piston means tends to exert a compressing and driving action against said combustion piston means during the combustion process as the generated steam acts to drive said steam piston means in time relationship to the movement of said combustion piston means such that power generated by said steam piston means is applied against said combustion piston means for assisting in driving the same.

2. The combustion type engine with said steam powered piston assist system of claim 1 wherein said steam cylinder means is formed directly adjacent said cylinder means of said engine, and wherein said steam piston means and said combustion piston means are disposed in alignment and in face-to-face relationship.

3. The combustion type engine with said steam powered piston assist system of claim 2 wherein said steam piston means is movably mounted between a retracted position within said steam cylinder means and an extended position, wherein in said extended position said steam piston means extends into said combustion cylinder means housing said combustion piston means; and wherein said steam piston means is provided with biasing means for normally biasing said steam piston means to said retracted position within said power assist cylinder means.

4. The combustion type engine with said steam powered piston assist system of claim 3 wherein said control means for controlling the flow of steam to said steam cylinder means includes a rotary valve means for directing steam to said steam cylinder means in accordance with the reciprocal movement of said combustion piston means, said rotary valve means including an inlet port for directing steam to said steam cylinder means and an exhaust port for channeling and directing the resulting water and/or steam from said steam cylinder means.

5. The combustion type engine with said steam powered piston assist system of claim 4 wherein said engine is of the type having throttle means for controlling the flow of fuel to said combustion cylinder means and wherein said means for directing steam from said steam generator means to said steam cylinder means includes a steam pipe and steam flow regulating valve means operatively associated with said engine throttle for regulating the flow of steam from said steam generator means to said steam cylinder means.

6. The combustion type engine with said steam powered piston assist system of claim 5 wherein said rotary valve means is secured to said steam pipe; and wherein said steam pipe is rotatively journaled; and wherein there is provided drive means for rotatively driving said steam pipe and said rotary valve means in timed relationship with the movement of said combustion piston means.

7. The combustion type engine with said steam powered piston assist system of claim 6 wherein said steam generator means includes exhaust heating means for utilizing the exhausted gases expelled from said engine for heating water within said steam generator means to produce steam, said exhaust heating means including means operatively interconnected between said engine and said steam generator means for directing exhaust gases from said engine to said steam generator means for heating the same.

8. The combustion engine with said steam powered piston assist system of claim 7 wherein said steam generator means includes upper and lower compartments separated by an exhaust gas passing section having a plurality of tubes extending therethrough and communicatively connected to said upper and lower sections, whereby water vapor tends to move from one section to another through said tubes as exhaust gases pass through said exhaust gas passing section.

9. The combustion engine with said steam powered piston assist system of claim 8 wherein said steam generator means includes a super heater section that extend adjacent said engine block where exhaust gases are being expelled and wherein said super heater section includes a steam channeling area for channeling steam or water vapor therethrough adjacent the area where said exhaust gases are being expelled from said engine block so as to super heat the liquid vapor or steam passing therethrough.

10. The combustion type engine with said steam powered piston assist system of claim 1 wherein there is provided an auxiliary steam producing assembly including conduit means that extends closely adjacent said combustion cylinder and which receives water therethrough, and wherein heat from the combustion process acts to generate steam from the water passing in said conduit means.

* * * * *